P. BARBER.
Plow-Fender.
No. 39,333. Patented July 28, 1863.
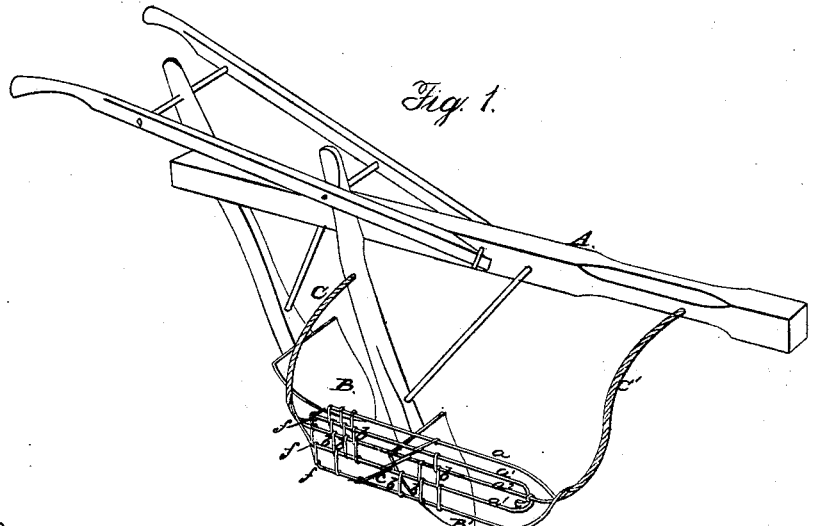
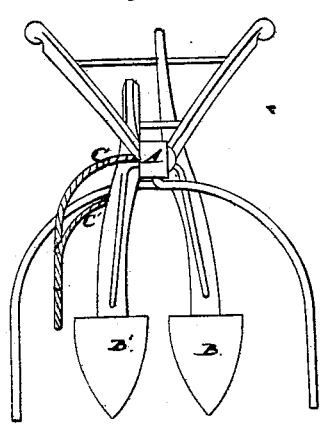
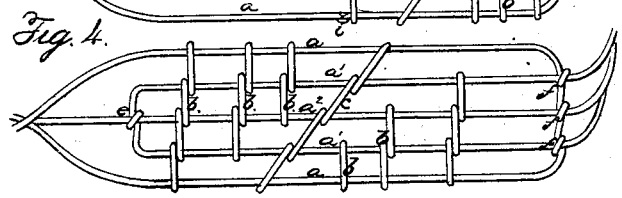
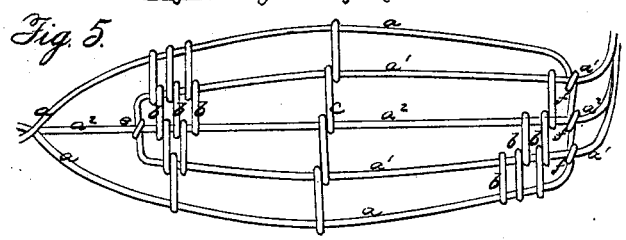

"UNITED STATES PATENT OFFICE.

PHILO BARBER, OF LOSTANT, ILLINOIS.

IMPROVEMENT IN PLANT-FENDERS.

Specification forming part of Letters Patent No. 39,333, dated July 28, 1863.

*To all whom it may concern:*

Be it known that I, PHILO BARBER, of Lostant, in the county of La Salle and State of Illinois, have invented a new and Improved Plant-Fender or Shield to be attached to cultivators or cultivator-plows; and I do hereby declare that the following is a full, clear, and exact description thereof, reference being had to the accompanying drawings, making a part of this specification, in which—

Figure 1 shows my improved fender applied to a common cultivator or plow adapted for cultivating growing plants. Fig. 2 is a front elevation of Fig. 1. Figs. 3, 4, 5 are enlarged views of the improved fender, representing it in different conditions.

Similar letters of reference indicate corresponding parts in the several figures.

This invention relates to an improvement in fender-guards, which are to be applied to shovel-plows or "cultivators," as they are commonly called, for the purpose of protecting the young plants from being covered up with earth, or injured by clods of earth falling on them in running the implement between the rows of plants.

The nature of my invention consists in constructing a fender or guard of wire formed into a frame-work and united by winding one wire upon another, and connected to the plow-beam by means of twisted wire rods, the whole being arranged as will be hereinafter described.

It also consists in a fender made up of flexible rods and furnished with transverse adjustable bars for the purpose of increasing or diminishing its width, according to the amount of earth thrown up by the shovels, or the size and strength of the growing plants and their capability to resist the earth, all as will be hereinafter described.

To enable others skilled in the art to make and use my invention, I will proceed to describe its construction and operation.

The drawings represent my invention applied to a common double-shovel corn cultivator, in which A is the beam, and B B' the shovels; but it will be seen that my invention is applicable to any and every variety of cultivator. On the right side of this machine I have shown, in Figs. 1 and 2, the improved fender, attached at its forward end to the beam A and at its rear end to the standard of the forward shovel, B'. The fender consists of five or more longitudinal wire rods, $a\ a\ a'\ a'\ a^2$, two curved supporting-rods, C C', transverse rods $b\ b\ b\ b$, and a diagonal rod, $c$, all of which are made of large wire manipulated into the form hereinafter described, and attached together by means of looping and twisting, as follows: The wire rod $a\ a$ is doubled and its two ends twisted together, with one end of the central rod, $a^2$, forming the supporting-rod C, and also an open frame, to which the rod $a'\ a'$ is attached. This rod $a'\ a'$ is doubled, it being, like rod $a\ a$, in one piece, and looped on the rod $a^2$ at $e$, and its ends, together with the central rod, $a^2$, are passed through the loops $f\ f\ f$, which are formed on the doubled rod $a\ a$, as shown in Figs. 1, 3, 4, and 5 of the drawings, and these ends are twisted together in a similar manner to the ends of rods $a\ a^2\ a$, forming the supporting-rod C'. The rods $a\ a\ a'\ a'\ a^2$ are now spread out and made to form a grating or skeleton of a fender, which, being made of wire, is very strong, and at the same time possesses sufficient stiffness to resist the pressure of the earth against it. To these longitudinal rods $a\ a\ a'\ a'\ a^2$, I apply a number of transverse rods, $b\ b\ b$, by looping these rods around the longitudinal rods, as clearly shown in the drawings, which loops keep the longitudinal rods at an equal distance apart when disposed in the position shown in Figs. 1, 3, and 4, and serve as stiffeners for these rods, and also as eyes, to allow their respective long and short rods to slide on the longitudinal rods and to be adjusted in any desired position. Besides these transverse brace-rods $b\ b$, I employ a diagonal rod, $c$, which is looped around each one of the longitudinal rods in a similar manner to the shorter rods $b$. The loops on this diagonal rod $c$ are arranged at greater distances apart than the loops on the shorter rods $b$, so that when these short rods $b$ are moved back to the ends of the longitudinal rods, as shown in Fig. 5, the rod $c$ may be placed in a transverse position in the center of the fender and made to spread out the rods $a\ a\ a'\ a'$, and thus to widen the fender. Another object in using the transverse rods $b\ b$ and the spreading-rod $c$ is to form a kind of sieve for pulverizing and sifting fine earth upon the young plants, which may be too tender to resist the heavy and coarser earth and clods. The fender which I have above described not only prevents the earth turned up on each side of the rows of plants by the shovels from covering up the plants, but it actually performs the office of a sieve, allowing only the fine soil to escape through its meshes to the plants. These meshes can be increased in size as the plants become stronger by arranging the sliding rods $b\ b$ as I have shown in Figs. 1, 3, and 4, and, finally, when the crop is very strong the rods $b\ b$ may be pushed aside and the fender spread to its utmost by means of the rod $c$, as shown in Fig. 5.

To prevent the spreading-rod $c$ from slipping out of its place when arranged as shown in Fig. 5, the rods $a\ a$ can be bent, as shown at $i\ i$ in red lines, Fig. 3, so that when the looped ends of the rod $c$ are slipped into these crooks it will be securely held in its place.

The advantages of the fender above described are that it is superior to others as a disintegrator, as well as a protector or guard. It is so constructed that it can be adjusted at all times to admit through it just as much fine earth as is desired or as the crop will support, and also fending off the clods and larger particles of earth which might injure the tender shoots, hence its construction of compact metal wires, which do not present a plain or flat surface to hinder the passage of fine earth through it, as a fender made of a sheet or plate of metal would do.

In the general construction of my improved wire fender it will be seen that I use neither bolt, nail, nor rivet, the whole thing being put together by looping and twisting the wires, and thus attaching them together. My fender can therefore be manufactured at a very trifling cost and by a common workman.

Having thus described my invention, what I claim as new, and desire to secure by Letters Patent, is—

1. A fender-guard consisting of longitudinal rods and sliding transverse rods, put together in such a manner as to form a sieve, the meshes of which are capable of being extended or contracted, substantially as and for the purposes herein described.

2. In combination with a flexible fender constructed substantially as described, the extension-rod $c$, or its its equivalent, substantially as described.

3. A fender or plant-shield constructed of longitudinal and transverse wire rods looped together and twisted, so as to constitute an open sieve-like frame, substantially as described, whether the meshes of the fender are variable or invariable in size.

<div style="text-align:right">PHILO BARBER.</div>

Witnesses:
  W. M. WATSON,
  C. COPELAND, Jr.